(12) United States Patent
Kudo et al.

(10) Patent No.: US 11,534,851 B2
(45) Date of Patent: Dec. 27, 2022

(54) SPATTER SCATTERING PREVENTION APPARATUS AND FLASH BUTT WELDER INCLUDING THE SAME

(71) Applicant: JP STEEL PLANTECH CO., Yokohama (JP)

(72) Inventors: Tomohiro Kudo, Yokohama (JP); Hiroshi Fujii, Yokohama (JP); Hiroshi Goto, Yokohama (JP); Susumu Okawa, Yokohama (JP)

(73) Assignee: JP STEEL PLANTECH CO., Yokohama (JP)

( * ) Notice: Subject to any disclaimer, the term of this patent is extended or adjusted under 35 U.S.C. 154(b) by 433 days.

(21) Appl. No.: 16/621,513

(22) PCT Filed: Jun. 14, 2018

(86) PCT No.: PCT/JP2018/022716
§ 371 (c)(1),
(2) Date: Dec. 11, 2019

(87) PCT Pub. No.: WO2018/230637
PCT Pub. Date: Dec. 20, 2018

(65) Prior Publication Data
US 2020/0114457 A1   Apr. 16, 2020

(30) Foreign Application Priority Data
Jun. 16, 2017   (JP) .............................. JP2017-118760

(51) Int. Cl.
*B23K 11/04*   (2006.01)
*B23K 11/36*   (2006.01)
(Continued)

(52) U.S. Cl.
CPC ............ *B23K 11/046* (2013.01); *B23K 11/36* (2013.01); *B23K 9/328* (2013.01); *B23K 11/31* (2013.01); *B23K 37/08* (2013.01); *B23K 2101/30* (2018.08)

(58) Field of Classification Search
CPC ....... B23K 11/046; B23K 11/31; B23K 11/36; B23K 2101/30; B23K 37/08; B23K 9/328;
(Continued)

(56) References Cited

U.S. PATENT DOCUMENTS 10,304,705 B2 *   5/2019   Teng ...................... B05B 3/085
2006/0278615 A1   12/2006   Okawa
(Continued)

FOREIGN PATENT DOCUMENTS

| CN | 101547766 A | 9/2009 |
| CN | 205271126 U | 6/2016 |

(Continued)

OTHER PUBLICATIONS

International Search Report dated Sep. 11, 2018 in PCT/JP2018/022716 filed Jun. 14, 2018, 2 pages.
(Continued)

*Primary Examiner* — Dana Ross
*Assistant Examiner* — James F Sims, III
(74) *Attorney, Agent, or Firm* — Oblon, McClelland, Maier & Neustadt, L.L.P.

(57) ABSTRACT

Provided is a spatter scattering prevention apparatus that eliminates the necessity to, for example, remove scattered spatters and thus makes it possible to facilitate maintenance work, and also provided is a flash butt welder including the spatter scattering prevention apparatus.
The spatter scattering prevention apparatus 1 according to the present invention is characterized by being configured to
(Continued)

form a water screen in midair in the vicinity of a welding spot, at which welding is performed, wherein the water screen is for preventing spatters, generated during the welding, from scattering.

The spatter scattering prevention apparatus is also characterized by being configured to form the water screen on one side in a lateral direction of the welding spot and form the water screen on the other side, laterally opposite to the one side, of the welding spot.

12 Claims, 2 Drawing Sheets

(51) Int. Cl.
*B23K 101/30* (2006.01)
*B23K 9/32* (2006.01)
*B23K 11/31* (2006.01)
*B23K 37/08* (2006.01)

(58) Field of Classification Search
CPC ......... B05B 7/0075; B05B 7/045; B05B 7/08; B05B 7/0846
USPC .............................................. 219/97, 137.43
See application file for complete search history.

(56) References Cited

U.S. PATENT DOCUMENTS

2011/0226107 A1* 9/2011 Mizuta ............... B23Q 11/0858
83/177
2012/0325932 A1* 12/2012 Tani ...................... B05B 7/0075
239/398
2019/0118200 A1* 4/2019 Hartman ................. B05B 7/045

FOREIGN PATENT DOCUMENTS

| CN | 205571698 U | 9/2016 |
| JP | 56-26679 A | 3/1981 |
| JP | 57-50284 A | 3/1982 |
| JP | 2001-212675 A | 8/2001 |
| JP | 2003-88954 A | 3/2003 |
| JP | 2006-341276 A | 12/2006 |
| JP | 4651746 B2 | 3/2011 |
| JP | 2014-24075 A | 2/2014 |
| KR | 2000-0016258 A | 3/2000 |
| KR | 10-2012-0062090 A | 6/2012 |
| PL | 209092 B1 | 7/2011 |
| WO | WO 2006/137187 A1 | 12/2006 |

OTHER PUBLICATIONS

European Search Report dated May 26, 2020 in European Patent Application No. 188184550, 3 pages.
Combined Chinese Office Action and Search Report dated Dec. 18, 2020 in Patent Application No. 201880037721.6 (with English machine translation and English translation of Category of Cited Documents), 14 pages.
Korean Office Action dated Apr. 22, 2021 in Korean Patent Application No. 10-2019-7033382 (with English machine translation), 7 pages.
Korean Patent Rejection Decision dated Sep. 13, 2021 in Korean Patent Application No. 10-2019-7033382 (with English machine translation), 5 pages.

* cited by examiner

SPATTER SCATTERING PREVENTION APPARATUS AND FLASH BUTT WELDER INCLUDING THE SAME

TECHNICAL FIELD

The present invention relates to a spatter scattering prevention apparatus for preventing spatters generated during flash butt welding from scattering, and a flash butt welder including the spatter scattering prevention apparatus.

BACKGROUND ART

In flash butt welding, two workpieces are clamped by respective electrodes, end surfaces of the workpieces are pressed against each other, and a large current is applied between the electrodes to melt the workpieces at the end surfaces by generated heat, whereby the entire end surfaces are welded.

During such flash butt welding, spatters are radially ejected from a welding spot, at which the end surfaces of the workpieces abut each other. Prevention of scattering of the spatters is needed for various reasons, such as that the spatters worsen the work environment and that they adhere to peripheral devices, necessitating routine cleaning.

As an apparatus for preventing spatters from scattering, there has been a "spatter collection apparatus used in flash welding," which is disclosed in Patent Document 1, for example.

The spatter collection apparatus disclosed in Patent Document 1 is as follows: "In an apparatus for collecting spatters ejected from a welding spot while flash welding is performed in a state where two workpieces are clamped by respective electrodes and end surfaces of the workpieces abut each other, a protective cover is provided that covers the welding spot with an inner wall surface extending in an axial direction and a radial direction, where the direction, in which the workpieces abut each other, is the axial direction; In the protective cover, the inner wall surface extending in the axial direction is formed as a cylindrical inner surface radially separated from the workpieces by a predetermined distance, with the axis being the center; and the protective cover has a water injection port facing in a tangential direction toward the cylindrical inner surface and a discharge port (see claim 1 of Patent Document 1)."

PRIOR ART DOCUMENT

Patent Document

[Patent Document 1] Japanese Patent Application Publication No. H09-94675 (JP 09-094675 A (1997))

SUMMARY OF INVENTION

Problems to be Solved by the Invention

The apparatus described in Patent Document 1 is such that spatters are prevented from scattering by the protective cover, on the inner surface of which a water layer is formed, and the spatters caught on the inner surface of the protective cover are washed away by the water layer.

However, it is impossible to completely wash the spatters away by the water layer. For this reason, it is required to remove residues of the spatters adhering to the protective cover, so that maintenance work such as cleaning is required, which is troublesome.

The present invention has been made to solve such a problem and an object of the present invention is to provide a spatter scattering prevention apparatus that makes it possible to eliminate the necessity to, for example, remove the scattered spatters and thus facilitates maintenance work, and to also provide a flash butt welder including the spatter scattering prevention apparatus.

Means for Solving the Problem (1) A spatter scattering prevention apparatus according to the present invention is characterized by being configured to form a water screen in midair in the vicinity of a welding spot, at which welding is performed, wherein the water screen is for preventing spatters, generated during the welding, from scattering.

(2) In the spatter scattering prevention apparatus according to the above item (1), the spatter scattering prevention apparatus is characterized by being configured to form the water screen on one side in a lateral direction of the welding spot and form the water screen on the other side, laterally opposite to the one side, of the welding spot.

(3) In the spatter scattering prevention apparatus according to the above item (2), the spatter scattering prevention apparatus is characterized by being configured to form the water screens so as to laterally surround the welding spot on four sides.

(4) In the spatter scattering prevention apparatus according to the above item (2) or (3), the spatter scattering prevention apparatus is characterized by including a nozzle pair, in which each nozzle has an outflow port with an elongated shape, wherein
the nozzle pair includes a first nozzle for forming the water screen on the one side and a second nozzle for forming the water screen on the other side.

(5) In the spatter scattering prevention apparatus according to the above item (4), the first nozzle is disposed on the other side so as to form the water screen at least over the welding spot and on the one side in the lateral direction of the welding spot.

(6) In the spatter scattering prevention apparatus according to the above item (4) or (5), the spatter scattering prevention apparatus is characterized in that
number of the nozzle pairs is two,
a first nozzle pair that is one of the two nozzle pairs includes the first nozzle and the second nozzle, and
a second nozzle pair that is the other of the two nozzle pairs includes a third nozzle for forming the water screen for covering one of two gaps between the water screen formed by the first nozzle and the water screen formed by the second nozzle, and a fourth nozzle for forming the water screen for covering the other of the two gaps.

(7) In the spatter scattering prevention apparatus according to any one of the above items (4) to (6),
at least one of the nozzles included in the nozzle pair includes:
a water reservoir portion; and
a rectifying nozzle portion having therein a water flow channel for guiding water from one end of the rectifying nozzle portion to the other end thereof, the one end being directly connected to the water reservoir portion, the other end having the outflow port, wherein
the water flow channel is such that the length thereof is equal to or greater than a predetermined value and a cross-sectional shape thereof is the same throughout its length.

(8) A flash butt welder according to the present invention is for welding a pair of workpieces by energizing and pressing against each other the pair of workpieces in a state where the pair of workpieces are in contact with each other, the flash butt welder being characterized by including the spatter scattering prevention apparatus according to any one of the above items (1) to (7).

(9) In the flash butt welder according to the above item (8), the flash butt welder is characterized by further including a carriage that has a pair of electrodes, respectively connected to the pair of workpieces, for performing the energizing and moves in conjunction with movement of the pair of workpieces being conveyed along a pass line, wherein the spatter scattering prevention apparatus is installed on the carriage.

Effects of the Invention

The spatter scattering prevention apparatus of the present invention is configured to form a water screen in midair in the vicinity of the welding spot, wherein the water screen is for preventing spatters, generated during the welding, from scattering. Accordingly, the necessity to clean the spatters adhering to a protective cover or the like for preventing spatters from scattering as in the case of a conventional apparatus is reduced because the spatters are caused to fall with the water screens and collected in a drain or the like. Thus, maintenance work is facilitated.

EMBODIMENT FOR CARRYING OUT THE INVENTION

Figure 1:
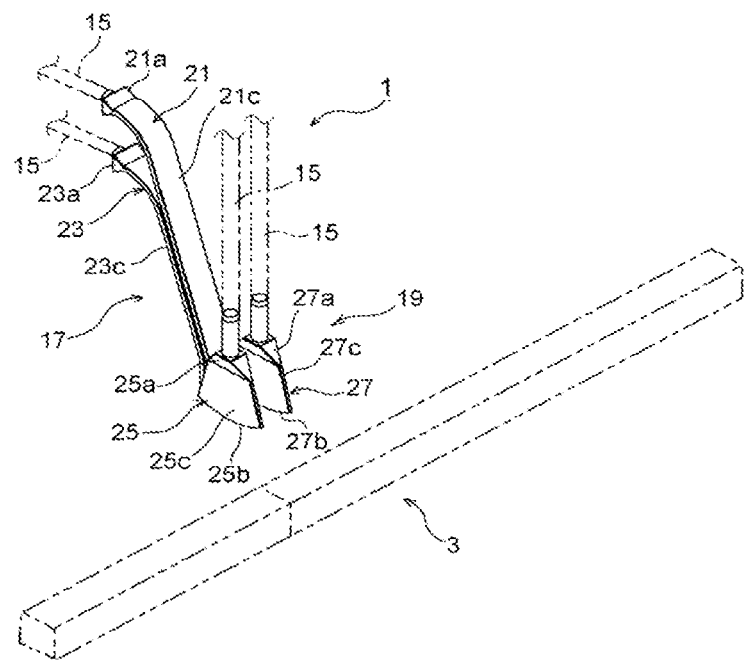
FIG. 1 is a perspective view of a spatter scattering prevention apparatus according to an embodiment of the present invention.

As shown in FIG. 1, a spatter scattering prevention apparatus 1 according to an embodiment is installed in a flash butt welder 5 (see FIG. 2) for welding a pair of workpieces 3 by energizing and pressing against each other the pair of workpieces 3 in a state where the pair of workpieces 3 are in contact with each other, the spatter scattering prevention apparatus 1 being configured to form a water screen in midair in the vicinity of a spot (hereinafter also referred to as the welding spot), at which welding is performed, wherein the water screen is for preventing spatters from scattering that are generated while the welding is performed.

In the present invention, the vicinity of the welding spot needs to be within a range of scatter of spatters from the welding spot. When peripheral devices, such as mechanical devices, are disposed around the welding spot, it is preferable that the spatter scattering prevention apparatus 1 be configured to form the water screen between the welding spot and the peripheral devices to suppress adherence of the spatters to the peripheral devices.

It is preferable that the water screen have a thickness enough to completely block the spatters. However, even when the water screen does not have such a sufficient thickness and the spatters therefore cannot be completely blocked, forming the water screen in midair in the vicinity of the welding spot brings about an effect of preventing the spatters from scattering to a certain extent.

Figure 2:
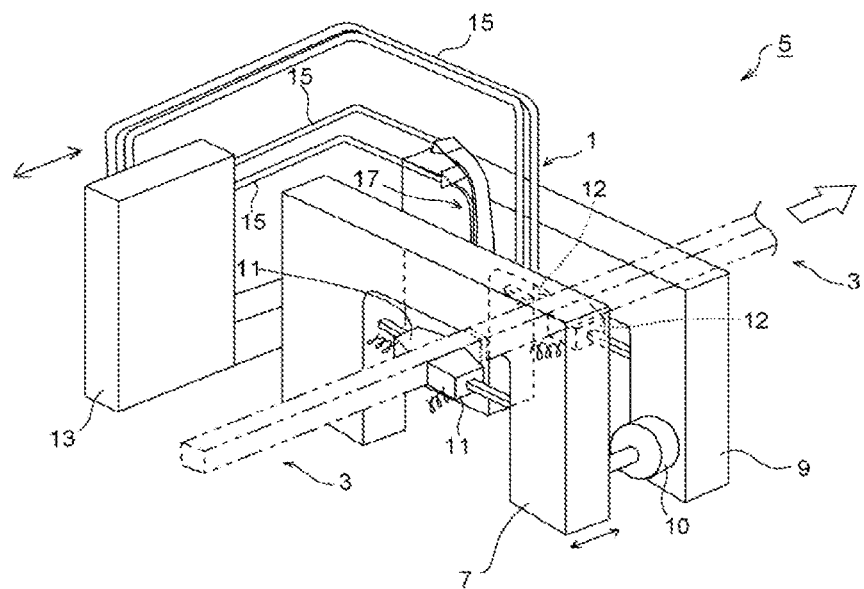
FIG. 2 is a schematic diagram of a flash butt welder including the spatter scattering prevention apparatus according to the embodiment of the present invention.

As shown in FIG. 2, the flash butt welder 5 of this embodiment, in which the spatter scattering prevention apparatus 1 is installed, includes: a carriage 13 installed so as to be able to move in conjunction with movement of the pair of workpieces 3 being conveyed along a pass line in the direction of the arrow; a movable head 7 for clamping one of the pair of workpieces 3; and a fixed head 9 for clamping the other of the pair of workpieces 3. The movable head 7 and the fixed head 9 are respectively provided with a pair of electrodes 11 and a pair of electrodes 12 to be connected to the pair of workpieces 3 for energization. The fixed head 9 is fixed to the carriage 13 and the movable head 7 is provided so as to be able to move relative to the fixed head 9 via a hydraulic cylinder 10.

During energization for welding, the carriage 13 of the flash butt welder 5 moves in conjunction with movement of the workpieces 3 at the same speed. Thus, the workpieces 3 are welded by the flash butt welder 5 while being continuously conveyed in a conveying direction and the welded workpiece 3 is then conveyed to the downstream process.

When the welding is finished, the carriage 13 is moved in the direction opposite to the conveying direction of the workpieces 3 and waits at a standby position until the next welding. In other words, the carriage 13 is installed so as to be able to travel back and forth within a certain range. As this flash butt welder, one that is described in the specification of Japanese Patent No. 4288552, for example, can be suitably used.

The spatter scattering prevention apparatus 1 of the present invention is installed on the carriage 13, so that the contact spot (welding spot) of the pair of workpieces 3 is surrounded on four sides and from above by the water screens formed by the spatter scattering prevention apparatus 1 during energization for welding.

Accordingly, it is possible to prevent the spatters generated during welding from scattering while the workpieces 3 are continuously conveyed and welded, so that it is possible to suppress adherence of the spatters to the peripheral devices, such as the movable head 7 and the fixed head 9 of the flash butt welder 5. Furthermore, the spatters caught by the water screens fall with the water of the water screens and are collected from a drain (not shown), which also reduces the burden of cleaning.

Next, the specific configuration of the spatter scattering prevention apparatus 1 will be described.

Figure 3:
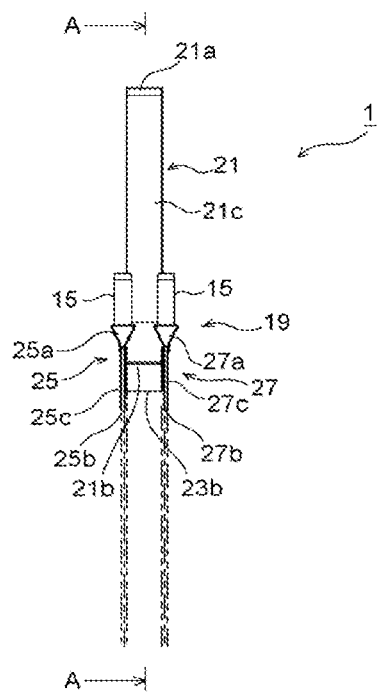
FIG. 3 is a front view of the spatter scattering prevention apparatus shown in FIG. 1.
Figure 4:
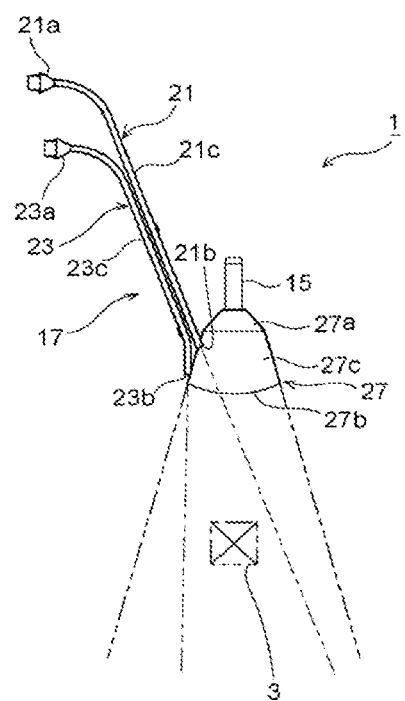
FIG. 4 is a sectional view on arrow A-A of FIG. 3 in the spatter scattering prevention apparatus shown in FIG. 1.

As shown in FIGS. 1, 3, and 4, the spatter scattering prevention apparatus 1 includes: a first nozzle pair 17 for forming water screens parallel to the axis of the workpiece 3; and a second nozzle pair 19 for forming water screens perpendicular to the axis of the workpiece 3 (billet).

The first nozzle pair 17 and the second nozzle pair 19 will be described in detail below.

<First Nozzle Pair>

The first nozzle pair 17 has a first nozzle 21 for forming the water screen on one side (right side in FIG. 4) of the welding spot of the billets, and a second nozzle 23 for forming the water screen on the other side (left side in FIG. 4) opposite to the one side.

When the water screen is formed in a wall shape on at least one side of the welding position, the effect of preventing the spatters from scattering is brought about on the one side. However, when the water screens are formed on one side and the other side, that is, on opposite sides of the welding spot so as to interpose the welding spot between the water screens, it is possible to prevent the spatters from scattering on these opposite sides. This is effective when there is an anisotropy in the number of spatters ejected, such as when flash butt welding is performed, and the water screens are formed in the directions, in which the number of spatters ejected is large.

Especially in the case of flash butt welding, there is a tendency that the number of spatters is large in directions parallel to a contact surface between the workpieces and therefore, it is possible to efficiently prevent spatters from scattering by forming the water screens on both sides in such directions.

<First Nozzle>

The first nozzle 21 is disposed above the second nozzle 23 on the other side. As shown in FIG. 4, an outflow port 21b of the first nozzle 21 faces obliquely downward. Thus, the first nozzle 21 is configured so as to be able to form the water screen both over the welding spot and on the one side in the lateral direction of the welding spot. Accordingly, the water screen formed by the first nozzle 21 is formed over the welding spot so as to extend from the other side to the one side as indicated by a chain double-dashed line in FIG. 4. In other words, the first nozzle 21 forms the water screen having both a ceiling portion covering over the welding spot and a side wall portion laterally covering the one side of the welding spot. Accordingly, it is possible to prevent spatters from scattering not only in the lateral direction from the welding spot but also in the upward direction from the welding spot.

The first nozzle 21 has: a water reservoir portion 21a connected to a water supply pipe 15 for supplying water for forming the water screen; and a rectifying nozzle portion 21c having therein a water flow channel for guiding water from one end of the rectifying nozzle portion 21c to the other end thereof, the one end being directly connected to the water reservoir portion 21a, the other end having the outflow port 21b.

The water reservoir portion 21a has a function of temporarily reserving the water supplied through the water supply pipe 15.

The water flow channel in the rectifying nozzle portion 21c is such that the length thereof is equal to or greater than a predetermined value and the cross-sectional shape thereof is the same throughout its length. The predetermined value of the length of the water flow channel is set in accordance with the thickness (the dimension of the cross section of the water flow channel in the thickness direction of the water screen) of the water screen to be formed, and, when it is required to increase the thickness of the water screen, the length of the water flow channel is increased. Specifically, it is preferable that the length of the water flow channel be equal to or greater than 40 times of the dimension of the cross section of the water flow channel in the thickness direction of the water screen. When the nozzle thus formed is used, it is possible to suppress the turbulence of the water screen caused by contraction, so that it is possible to more reliably form the water screen with a desired width in the vicinity of the welding spot. Although there is no upper limit to the length of the water flow channel, the size of the facility becomes too large when the length is too long.

It is preferable that the thickness of the water screen be set equal to or greater than 15 mm and it is more preferable that it be set equal to or greater than 20 mm. The water screen with a thickness of 15 mm or more can bring about the effect of catching spatters sufficiently. The thicker the water screen is, the better the effect of catching spatters becomes. However, the amount of water also increases correspondingly. For this reason, from the viewpoint of economy, it is preferable that the thickness of the water screen be set equal to or less than 40 mm at the maximum, and it is more preferable that it be set equal to or less than 30 mm.

In order to stably form the water screen with a desired thickness and width, it is required to control the flow rate of the water screen within a certain range in accordance with the thickness, width, etc. of the water screen. When the flow rate is too low, the width of the water screen tapers due to contraction and, on the other hand, when the flow rate is too high, the water screen is diffused, which makes the effect of catching spatters insufficient. For example, when the thickness of the water screen is set to about 20 mm and the width thereof is set to about 60 mm, it is preferable that the flow rate of the water screen be set between 2.0 m/s and 3.0 m/s. Note that the width of the water screen can be set at will by changing the shape (dimensions) of the water flow channel and may be set to a desired value. For example, when the spatter scattering prevention apparatus of the present invention is used for a flash butt welder for joining end surfaces of billets, it suffices that the width of the water screen be set to about 50 to 100 mm.

The outflow port 21b of the rectifying nozzle portion 21c has an elongated shape. The elongated shape means a shape such that the dimension in the direction, in which the water screen is formed, that is, the direction, in which the water screen spreads (width direction of the water screen), is long relative to the dimension in the thickness direction of the water screen. In this embodiment, this shape means a flat, rectangular section. However, the section is not limited to the rectangular section as in the case of this embodiment.

<Second Nozzle>

As in the case of the first nozzle 21, the second nozzle 23 has: a water reservoir portion 23a; and a rectifying nozzle portion 23c having an outflow port 23b. The shape of the water reservoir portion 23a and that of the rectifying nozzle portion 23c are similar to those of the first nozzle 21.

However, as shown in FIG. 4, since the second nozzle 23 forms the water screen downward in the vertical direction, the second nozzle 23 differs from the first nozzle 21 in that a lower portion of the rectifying nozzle portion 23c is bent so as to be directed in the downward vertical direction.

<Second Nozzle Pair>

The second nozzle pair 19 is for forming the water screens perpendicular to the axis of the workpieces 3. As shown in FIGS. 1 and 3, the second nozzle pair 19 consists of a third nozzle 25 and a fourth nozzle 27 disposed so as to be separated by a certain interval in the axial direction of the workpieces 3.

In this embodiment, as shown in FIGS. 1 and 4, the third nozzle 25 and the fourth nozzle 27 are disposed so that the first nozzle pair 17 is positioned between the third nozzle 25 and the fourth nozzle 27. The third nozzle 25 and the fourth nozzle 27 are separated from each other by a distance substantially equal to the width of the rectifying nozzle portions 21c and 23c of the first nozzle pair 17.

When the third nozzle 25 and the fourth nozzle 27 are disposed as described above, of the two gaps, or openings, between the water screen formed by the first nozzle 21 and the water screen formed by the second nozzle 23, which are the upstream-side gap and the downstream-side gap in the conveying direction of the workpieces 3 in this embodiment, the upstream-side gap is covered by the water screen formed by the third nozzle 25 and the downstream-side gap is covered by the water screen formed by the fourth nozzle 27.

In other words, in this embodiment, the first nozzle pair 17 and the second nozzle pair 19 are configured to form the water screens so as to laterally surround the welding spot on the four sides. Thus, it is possible to reliably prevent the spatters from scattering.

<Third Nozzle>

As in the case of the first nozzle 21, the third nozzle 25 has: a water reservoir portion 25a; and a rectifying nozzle portion 25c having an outflow port 25b. The shape of the water reservoir portion 25a is similar to that of the first nozzle 21.

As shown in FIG. 4, the rectifying nozzle portion 25c has a sector-like shape such that the width thereof increases from the connection side, on which the rectifying nozzle portion 25c is connected to the water reservoir portion 25a, toward the end thereof. The length of the rectifying nozzle portion 25c is less than that of the first nozzle 21. The section of the rectifying nozzle portion 25c has a shape such that the width thereof increases from the water reservoir portion 25a toward the end thereof. The outflow port 25b at the end of the rectifying nozzle portion 25c has a curved, elongated shape.

Since most of the spatters generated during flash butt welding are ejected in the directions perpendicular to the conveying direction of the workpieces 3 and ejection of spatters in the directions along the conveying direction of the workpieces 3 is relatively little, the influence of reduction in thickness of the water screen is not significant. For this reason, the third nozzle 25 is formed in this shape so that it is possible to reduce the amount of water by reducing the thickness of the water screen and at the same time, it is possible to broaden the water screen as much as possible to sufficiently cover the gap between the water screen formed by the first nozzle 21 and the water screen formed by the second nozzle 23.

<Fourth Nozzle>

The fourth nozzle 27 has a water reservoir portion 27a and a rectifying nozzle portion 27c having an outflow port 27b, which are the same in shape as those of the third nozzle 25.

In the flash butt welder 5 of this embodiment configured as described above, the pair of workpieces 3 conveyed along the pass line are clamped by the electrodes 11 and 12 of the movable head 7 and the fixed head 9 and are welded by energizing and pressing against each other the pair of workpieces 3 while the movable head 7 is moved toward the fixed head 9. During the welding, since the spatter scattering prevention apparatus 1 is installed on the carriage 13 that moves with the movable head 7, the first nozzle pair 17 and the second nozzle pair 19 move in conjunction with movement of the carriage 13, that is, in conjunction with the spot, at which welding is performed.

During energization for welding, water is supplied through the water supply pipe 15, the water screens are formed on the lateral sides (one side and the other side) of the workpieces 3 by the first nozzle 21 and the second nozzle 23, and the water screens spreading perpendicularly to the axis of the workpieces 3 are formed by the third nozzle 25 and the fourth nozzle 27.

The spatters are ejected radially from the welding spot. The water screens are formed so as to laterally surround the welding spot on the four sides and also cover the welding spot from above. The spatters having impinged on the water screens fall with the water of the water screens and collected in a drain (not shown).

As described above, the spatters ejected radially from the welding spot are large in ejection amount especially in the directions perpendicular to the axis of the workpieces 3 and therefore, scattering of such spatters is prevented by the relatively thick water screens that are formed by the first nozzle pair 17. Also as described above, in the first nozzle 21 and the second nozzle 23 included in the first nozzle pair 17, the water flow channels of the rectifying nozzle portions 21c and 23c are such that the length thereof is equal to or greater than the predetermined value and the cross-sectional shape thereof is the same throughout its length. Thus, the water screens are stably formed without interruption from top to bottom, so that it is possible to reliably prevent the spatters from scattering.

The spatters ejected along the axial direction of the workpieces 3 are caught by the water screens formed by the second nozzle pair 19. However, since ejection of spatters along this direction is relatively little and the water screens formed by the second nozzle pair 19 intersect the workpieces 3, it is preferable that the thickness of the water screens formed by the second nozzle pair 19 be set to a small value to reduce the amount of water required.

As described above, according to the spatter scattering prevention apparatus 1 of this embodiment, the necessity to, for example, clean the spatters adhering to a protective cover or the like for preventing spatters from scattering as in the case of a conventional apparatus is reduced because the spatters fall with the water of the water screens and collected in a drain or the like. Thus, maintenance work is facilitated.

While the present invention has been described with reference to the embodiment, the present invention is not limited to the above-described embodiment. The scope of the present invention is determined based on the attached claims and all the configurations obtained by omitting, changing, and/or improving the constituent elements within the scope of the present invention are also included in the present invention.

For example, the above embodiment shows an example, in which the spatters are surrounded on the four sides by the first nozzle pair 17 and the second nozzle pair 19. However, since the number of spatters ejected from the welding spot in the directions perpendicular to the workpieces 3 is large as described above, even when only the first nozzle pair 17 for forming the water screens that laterally extend along the axis of the workpieces 3 is used, the effect of preventing the spatters from scattering is brought about to a certain extent.

DESCRIPTION OF REFERENCE NUMERALS

1: spatter scattering prevention apparatus
3: a pair of workpieces
5: flash butt welder
7: movable head
9: fixed head
10: hydraulic cylinder
11, 12: electrode
13: carriage
15: water supply pipe
17: first nozzle pair
19: second nozzle pair
21: first nozzle
21a: water reservoir portion
21b: outflow port
21c: rectifying nozzle portion
23: second nozzle
23a: water reservoir portion
23b: outflow port
23c: rectifying nozzle portion
25: third nozzle
25a: water reservoir portion 25b: outflow port
25c: rectifying nozzle portion
27: fourth nozzle
27a: water reservoir portion
27b: outflow port
27c: rectifying nozzle portion

The invention claimed is:

1. A spatter scattering prevention apparatus, comprising:
a pair of nozzles including a first nozzle and a second nozzle, each nozzle having an outflow port with an elongated shape such that a water screen is formed in a wall shape on one side of a welding spot in a lateral direction of the welding spot, wherein
each nozzle of the pair of nozzles is configured to form each water screen having a thickness in midair in a vicinity of the welding spot such that the water screen prevents scattering of spatters generated during welding at the welding spot where the welding is performed,
the first nozzle is configured to form one water screen on the one side in the lateral direction of the welding spot, and
the second nozzle is configured to form another water screen on the other side, the other side being laterally opposite to the one side, of the welding spot.

2. The spatter scattering prevention apparatus according to claim 1, wherein the spatter scattering prevention apparatus is configured to form the water screens that laterally surround the welding spot on four sides.

3. The spatter scattering prevention apparatus according to claim 1, wherein the first nozzle is positioned on the other side so that the water screen is formed at least over the welding spot and on the one side in the lateral direction of the welding spot.

4. The spatter scattering prevention apparatus according to claim 1, wherein the pair of the nozzles comprises two pairs, a first nozzle pair and a second nozzle pair,
the first nozzle pair includes the first nozzle and the second nozzle, and
the second nozzle pair includes a third nozzle configured to form a water screen and cover one of two gaps between the water screen formed by the first nozzle and the water screen formed by the second nozzle, and a fourth nozzle configured to form a water screen and cover the other of the two gaps.

5. The spatter scattering prevention apparatus according to claim 1, wherein at least one of the nozzles included in the pair of the nozzles includes
a water reservoir portion, and
a rectifying nozzle portion including a water flow channel that guides water from one end to the other end of the rectifying nozzle portion, the one end being directly connected to the water reservoir portion, the other end having the outflow port,
wherein the water flow channel is formed such that the water flow channel has a length which is equal to or greater than 40 times of a dimension of cross section of the water flow channel in a thickness direction of the water screen and a cross-sectional shape of the water flow channel is the same throughout the length.

6. The spatter scattering prevention apparatus according to claim 1, wherein
the thickness of said each water screen is equal to or greater than 15 mm.

7. The spatter scattering prevention apparatus according to claim 6, wherein the thickness of said each water screen is 20 mm-40 mm.

8. The spatter scattering prevention apparatus according to claim 6, wherein the thickness of said each water screen is 15 mm-40 mm.

9. The spatter scattering prevention apparatus according to claim 8, wherein the thickness of said each water screen is 15 mm-30 mm.

10. A flash butt welder for welding a pair of workpieces by energizing and pressing against each other the pair of workpieces in a state where the pair of workpieces are in contact with each other, the flash butt welder comprising:
the spatter scattering prevention apparatus of claim 1.

11. The flash butt welder according to claim 10, further comprising:
a carriage that includes a pair of electrodes, respectively connected to the pair of workpieces and configured to perform the energizing, the carriage being configured to move in conjunction with movement of the pair of workpieces being conveyed along a pass line, wherein
the spatter scattering prevention apparatus is installed on the carriage.

12. The flash butt welder according to claim 11, wherein said each nozzle in the spatter scattering prevention apparatus is configured to form said each water screen that surrounds the welding spot during the energizing.

* * * * *